(12) United States Patent
Chen (10) Patent No.: US 11,314,303 B2
(45) Date of Patent: Apr. 26, 2022

(54) ELECTRONIC DEVICE AND POWER DISTRIBUTION METHOD

(71) Applicant: Aten International Co., Ltd., New Taipei (TW)

(72) Inventor: Sin-Hong Chen, New Taipei (TW)

(73) Assignee: Aten International Co., Ltd., New Taipei (TW)

( * ) Notice: Subject to any disclaimer, the term of this patent is extended or adjusted under 35 U.S.C. 154(b) by 0 days.

(21) Appl. No.: 17/031,866

(22) Filed: Sep. 24, 2020

(65) Prior Publication Data

US 2021/0191486 A1    Jun. 24, 2021

(30) Foreign Application Priority Data

Dec. 19, 2019 (TW) ................................. 108146626

(51) Int. Cl.
*G06F 1/26* (2006.01)
*G06F 1/16* (2006.01)

(52) U.S. Cl.
CPC ............ *G06F 1/266* (2013.01); *G06F 1/1632* (2013.01); *G06F 2213/0042* (2013.01)

(58) Field of Classification Search
CPC ........ G06F 1/1632; G06F 1/189; G06F 1/266; G06F 1/28; G06F 1/30; G06F 13/4022; G06F 2213/0042; G06F 1/263; H02J 7/0063

See application file for complete search history.

(56) References Cited

U.S. PATENT DOCUMENTS

| | | | |
|---|---|---|---|
| 2014/0325245 A1* | 10/2014 | Santini | G06F 1/266 |
| | | | 713/300 |
| 2017/0344507 A1 | 11/2017 | Chen et al. | |
| 2017/0364463 A1* | 12/2017 | Chen | G06F 13/4282 |
| 2018/0120910 A1* | 5/2018 | Farkas | G06F 1/266 |
| 2018/0341315 A1* | 11/2018 | Suganuma | G06F 1/3253 |
| 2019/0197952 A1 | 6/2019 | Chaji | |
| 2019/0238705 A1* | 8/2019 | Shimamura | G06F 1/28 |
| 2019/0238706 A1* | 8/2019 | Sakai | G06F 1/28 |
| 2019/0267817 A1* | 8/2019 | Weissinger | H02J 7/007 |
| 2020/0012326 A1* | 1/2020 | Steele | G06F 1/266 |
| 2020/0091758 A1* | 3/2020 | Jahan | H02J 7/00 |

(Continued)

FOREIGN PATENT DOCUMENTS

| | | |
|---|---|---|
| CN | 108233433 | 6/2018 |
| TW | I540417 | 7/2016 |

(Continued)

*Primary Examiner* — Thomas J. Cleary
(74) *Attorney, Agent, or Firm* — JCIPRNET (57) ABSTRACT

An electronic device and a power distribution method are provided. The electronic device obtains operating power information of a first power receiving device, operating power information of a power supply device, and operating power information of at least one second power receiving device. The electronic device further dynamically adjusts power supplied from the power supply device to the first power receiving device and power supplied to the at least one second power receiving device according to the operating power information of the power supply device, the operating power information of the first power receiving device, and the operating power information of the at least one second power receiving device.

23 Claims, 6 Drawing Sheets

(56) References Cited

U.S. PATENT DOCUMENTS

| | | | | |
|---|---|---|---|---|
| 2020/0209941 A1* | 7/2020 | Shiba | .................... | H02J 7/0048 |
| 2020/0236242 A1* | 7/2020 | Kwak | ................ | H04N 1/00899 |
| 2020/0310705 A1* | 10/2020 | Kato | .................... | G06F 3/1221 |
| 2021/0097017 A1* | 4/2021 | Santini | .................... | G06F 1/206 |
| 2021/0103539 A1 | 4/2021 | Woodbury | .............. | G06F 1/266 |
| 2021/0167623 A1* | 6/2021 | Sanghvi | ................ | H02J 7/0045 |

FOREIGN PATENT DOCUMENTS

| | | |
|---|---|---|
| TW | I620388 | 4/2018 |
| TW | I630476 | 7/2018 |
| WO | 2012020380 | 2/2012 |

* cited by examiner

ELECTRONIC DEVICE AND POWER DISTRIBUTION METHOD

CROSS-REFERENCE TO RELATED APPLICATION

This application claims the priority benefit of Taiwan application serial no. 108146626, filed on Dec. 19, 2019. The entirety of the above-mentioned patent application is hereby incorporated by reference herein and made a part of this specification.

BACKGROUND

Technical Field

The invention relates to an electronic device and a power distribution method, and more particularly, to an electronic device having a power distribution mechanism and a power distribution method.

Description of Related Art

A USB Type-C port may support a power supply of 15 to 100 watts. The USB Type-C port may be used as a power supply port and a power receiving port for various electronic devices. As the European Union requires the specification of the power supply port and the specification of the power receiving port on electronic equipment to be unified, the USB type-C port is to become the unified specification of the power supply port and the power receiving port on the electronic equipment. Therefore, the multi-port expansion devices such as multi-port expansion devices (docking devices) having multiple USB Type-C ports, KVM switches, or other types of multi-port electronic devices may become popular.

In each of the above multi-port electronic devices (the multi-port expansion devices or the KVM switches), power of an adapter may be received through the power receiving port. However, when the multi-port electronic device is simultaneously connected to a plurality of power receiving devices having different power source needs, the multi-port electronic device cannot adjust and distribute the received power according to the power demands of all of the power receiving devices. Once the power demands of all of the power receiving devices are greater than the power that may be provided by the adapter and an overload condition occurs, the multi-port electronic device cannot effectively supply power to the power receiving devices or disable the adapter.

SUMMARY

The invention is directed to an electronic device having a power distribution mechanism and a power distribution method.

The invention provides an electronic device including a first power supply port, a power receiving port, at least one second power supply port, and a control circuit. The first power supply port is electrically connected to a first power receiving device. The power receiving port is electrically connected to a power supply device. The at least one second power supply port is electrically connected to at least one second power receiving device, respectively. The control circuit is coupled to the power receiving port, the first power supply port, and the at least one second power supply port. The control circuit obtains operating power information of the first power receiving device, operating power information of the power supply device, and operating power information of the at least one second power receiving device. The control circuit dynamically adjusts power supplied to the first power receiving device and power supplied to the at least one second power receiving device from the power supply device according to the operating power information of the power supply device, the operating power information of the first power receiving device, and the operating power information of the at least one second power receiving device.

The invention provides a power distribution method, and the method includes the following steps. Operating power information of a first power receiving device, operating power information of a power supply device, and operating power information of at least one second power receiving device is obtained through a first power supply port, a power receiving port, and at least one second power supply port. Power supplied to the first power receiving device and power supplied to the at least one second power receiving device from the power supply device is dynamically adjusted according to the operating power information of the power supply device, the operating power information of the first power receiving device, and the operating power information of the at least one second power receiving device.

Based on the above description, the electronic device and the power distribution method of the invention dynamically adjust the power supplied to the first power receiving device and the power supplied to the at least one second power receiving device according to the operating power information of the power supply device, the operating power information of the first power receiving device, and the operating power information of the at least one second power receiving device. Therefore, the electronic device is capable of dynamically supplying power to at least one of the first power receiving device and the at least one second power receiving device according to the plurality of pieces of the operating power information. As such, the electronic device may effectively supply power to at least one of the first power receiving device and the at least one second power receiving device.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
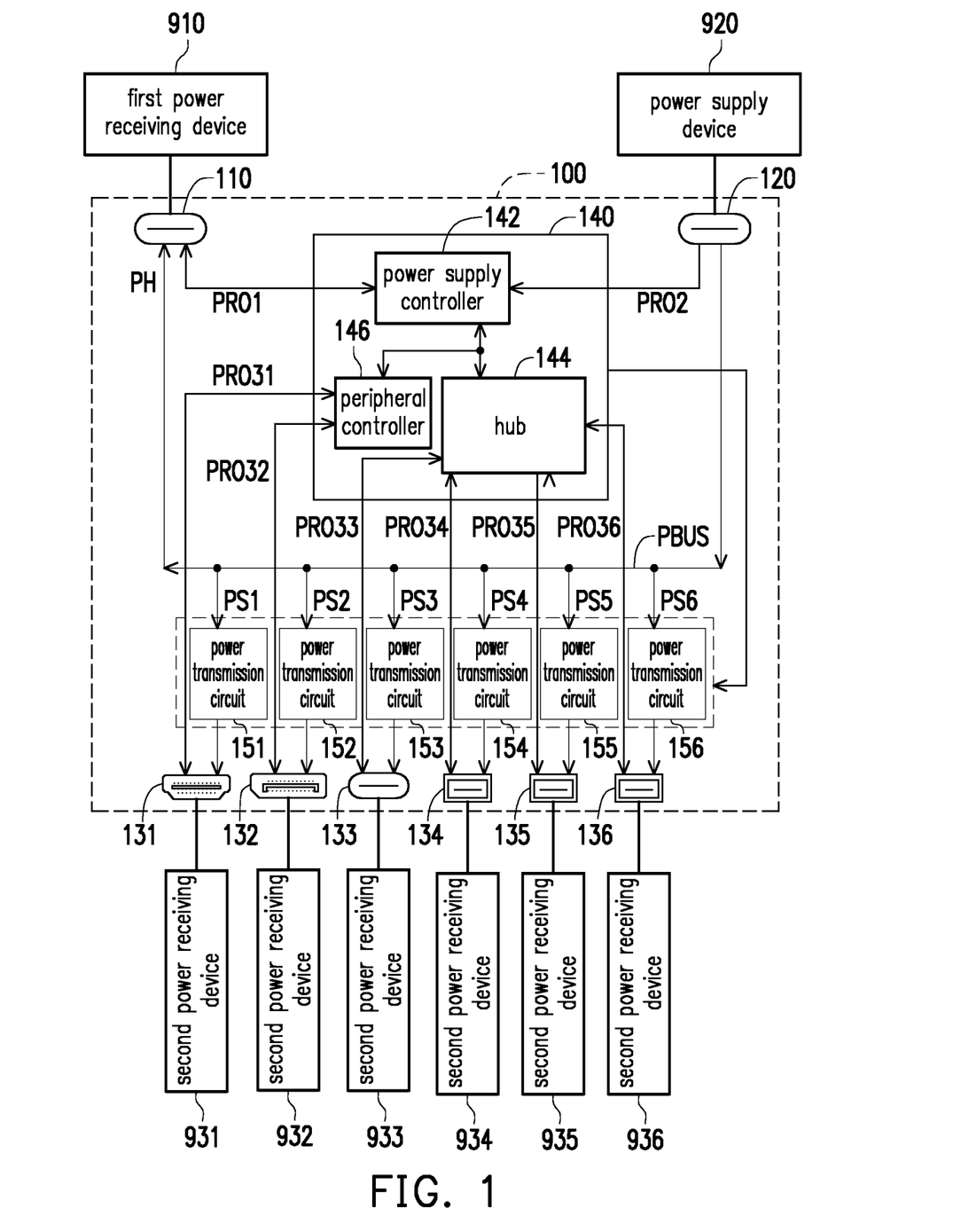
FIG. 1 is a schematic diagram illustrating a device of an electronic device according to an embodiment of the invention.
Figure 2:
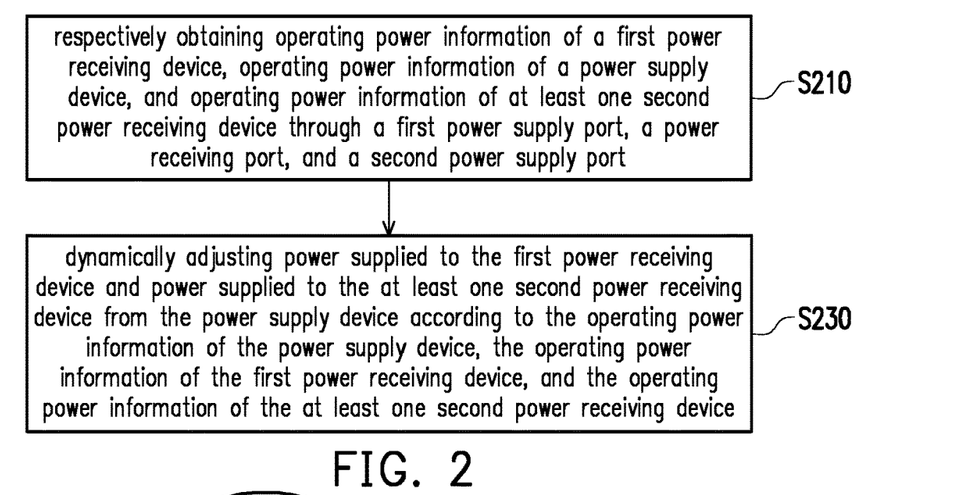
FIG. 2 is a flow chart illustrating a method of a power distribution method according to an embodiment of the invention.

Referring to FIG. 1 and FIG. 2 together, FIG. 1 is a schematic diagram illustrating a device of an electronic device according to an embodiment of the invention. FIG. 2 is a flow chart illustrating method of a power distribution method according to an embodiment of the invention. In the embodiment, an electronic device 100 may be a multi-port expansion device (docking device) or a KVM switch. The electronic device 100 includes a first power supply port 110, a power receiving port 120, second power supply ports 131-136, and a control circuit 140. The first power supply port 110 is electrically connected to a first power receiving device 910. The power receiving port 120 is electrically connected to a power supply device 920. The first power supply port 110 and the power receiving port 120 may be designed as upstream ports. The power supply device 920 is, for example, any electronic device capable of supplying power, for example, an adaptor, a desktop computer, a notebook computer, a television, a display, etc. The electronic device 100 may receive power provided by the power supply device 920 through the power receiving port 120. The second power supply ports 131-136 are electrically connected to second power receiving devices 931-936, respectively. For example, the second power supply port 131 is electrically connected to the second power receiving device 931, the second power supply port 132 is electrically connected to the second power receiving device 932, and the rest may be deduced by analogy. The second power supply ports 131-136 may be designed as downstream ports. In the embodiment, a number of the second power supply ports and a number of the second power receiving devices are, for example, respectively 6. The number of the second power supply port of the invention may be one or plural. The number of the second power receiving device of the invention may be one or plural. The invention is not limited to the number of the second power supply ports and the number of the second power receiving devices of the embodiment.

In the embodiment, the control circuit 140 is coupled to the first power supply port 110, the power receiving port 120, and the second power supply ports 131-136. The control circuit 140 is, for example, a central processing unit (CPU) or a programmable microprocessor of a general purpose or a special purpose, a digital signal processor (DSP), a programmable controller, an application specific integrated circuit (ASIC), a programmable logic device (PLD), or other similar devices or a combination of the above devices, which may load and execute computer programs.

In step S210, the control circuit 140 obtains operating power information PRO1 of the first power receiving device 910, operating power information PRO2 of the power supply device 920, and operating power information PRO31-PRO36 of the second power receiving devices 931-936. That is, the control circuit 140 may receive the operating power information PRO1 of the first power receiving device 910 through the first power supply port 110, receive the operating power information PRO2 of the power supply device 920 through the power receiving port 120, and receive the operating power information PRO31-PRO36 of the second power receiving devices 931-936 through the second power supply ports 131-136. For example, the operating power information PRO31 is provided by the second power receiving device 931, the operating power information PRO32 is provided by the second power receiving device 932, and the rest may be deduced by analogy.

In the embodiment, the first power supply port 110 is a USB type C port. The power receiving port 120 is also a USB type C port. In the embodiment, the second power supply ports 131-132 may be image transmission ports, for example, high definition multimedia interface (HDMI) connection ports, display ports (DPs), etc. The second power supply ports 131 and 132 are electrically connected to the second power receiving devices 931 and 932, respectively. That is, the second power receiving devices 931 and 932 are multimedia devices. The second power supply ports 133-136 may be any type of USB ports. The second power supply ports 133-136 are electrically connected to the second power receiving devices 933-936, respectively. That is, the second power receiving devices 933-936 are, for example, USB devices. The control circuit 140 includes a power supply controller 142, a hub 144, and a peripheral controller 146. The power supply controller 142 is coupled to the first power supply port 110 and the power receiving port 120. The power supply controller 142 obtains the operating power information PRO1 of the first power receiving device 910 and the operating power information PRO2 of the power supply device 920. The hub 144 is coupled to the power supply controller 142 and the second power supply ports 133-136 (i.e., the USB ports). The hub 144 may obtain the operating power information PRO33-PRO36 of the second power receiving devices 933-936. The peripheral controller 146 is coupled to the power supply controller 142 and the second power supply ports 131 and 132 (i.e., the image transmission ports). The peripheral controller 146 may obtain the operating power information PRO31-PRO32 of the second power receiving devices 931 and 932.

In step S230, the control circuit 140 dynamically adjusts power PH supplied to the first power receiving device 910 and power PS1-PS6 supplied to the second power receiving devices 931-936 from the power supply device 920 according to the operating power information PRO2 of the power supply device 920, the operating power information PRO1 of the first power receiving device 910, and the operating power information PRO31-PRO36 of the second power receiving devices 931-936.

In the embodiment, the control circuit 140 may integrate the operating power information PRO1, PRO2, and PRO31-PRO36. In step S230, the control circuit 140 may adjust the power PH supplied to the first power receiving device 910 and the power PS1-PS6 supplied to the second power receiving devices 931-936 according to the operating power information PRO1, PRO2, and PRO31-PRO36. In this way, the electronic device 100 may perform dynamic power distribution according to the operating power information PRO1, PRO2, and PRO31-PRO36, so as to effectively supply power to at least one of the first power receiving device 910 and the second power receiving devices 931-936.

Figure 3:
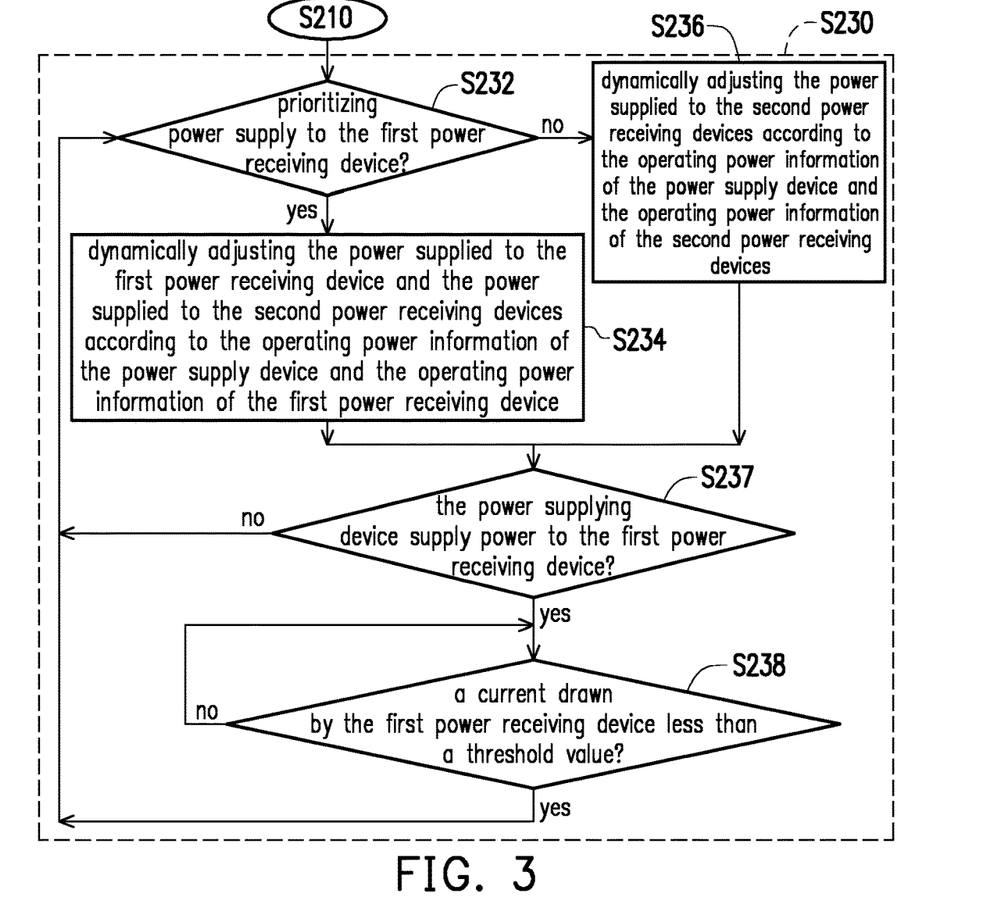
FIG. 3 is a flow chart illustrating a method according to step S230 of FIG. 2.

Step S230 of FIG. 2 is described in detail below. Referring to FIG. 1 and FIG. 3 together, FIG. 3 is a flow chart illustrating a method according to step S230 of FIG. 2. In step S232 of the embodiment, the control circuit 140 determines whether to prioritize power supply to the first power receiving device 910 to obtain a first determination result. In the embodiment, the first power supply port 110 is an upstream port, and the control circuit 140 may determine to prioritize power supply to the first power receiving device 910 when the first power receiving device 910 is connected to the first power supply port 110.

In the embodiment, if the first determination result is "yes", that is, the power is prioritized to be supplied to the first power receiving device 910, the control circuit 140 dynamically adjusts the power PH supplied to the first power receiving device 910 and the power PS1-PS6 supplied to the second power receiving devices 931-936 according to the operating power information PRO2 of the power supply device 920 and the operating power information PRO1 of the first power receiving device 910 in step S234. On the other hand, if the first determination result is "no", that is, the power is not prioritized to be supplied to the first power receiving device 910, the control circuit 140 dynamically adjusts the power PS1-PS6 supplied to the second power receiving devices 931-936 without prioritizing power supply to the first power receiving device 910 according to the operating power information PRO2 of the power supply device 920 and the operating power information PRO31-PRO36 of the second power receiving devices 931-936 in step S236.

Next, in step S237, the control circuit 140 determines whether the power supply device 920 continuously supplies power to the first power receiving device 910. In the case that the power supply device 920 continuously supplies power to the first power receiving device 910, the electronic device 100 detects a current drawn by the first power receiving device 910 in step S238. On the other hand, in the case that the power supply device 920 does not supply power to the first power receiving device 910, for example, the power supply device 920 is removed, step S232 is performed again, and the control circuit 140 re-determines whether to prioritize power supply to the first power receiving device 910. In step S238, the control circuit 140 determines whether the current drawn by the first power receiving device 910 is less than a threshold value, so as to obtain a second determination result. If the current drawn by the first power receiving device 910 is greater than or equal to the threshold value (i.e., the first power receiving device 910 is not fully charged), the electronic device 100 continuously executes step S238. That is, if the second determination result is "no", the electronic device 100 may continuously execute step S238. On the other hand, if the current drawn by the first power receiving device 910 is less than the threshold value (i.e., the first power receiving device 910 is fully charged and reaches a fully charged state), the control circuit 140 re-executes step S232 to re-determine whether to prioritize power supply to the first power receiving device 910. Namely, if the second determination result is "yes", the control circuit 140 re-executes step S232.

Figure 4:
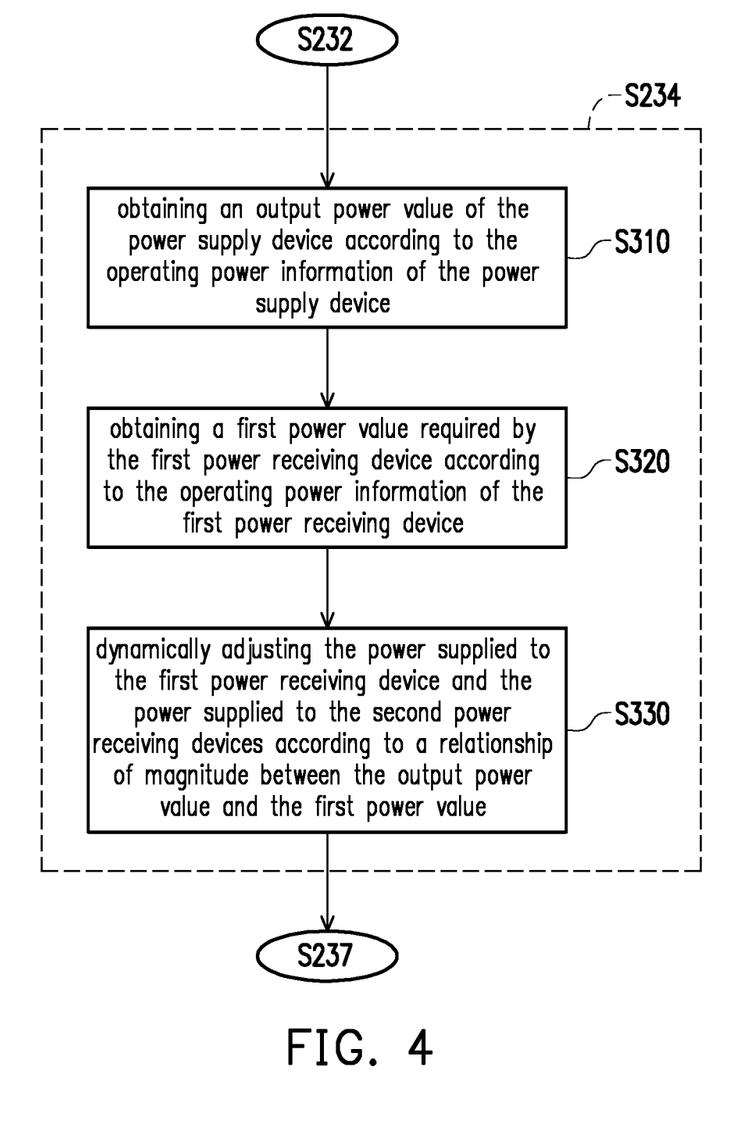
FIG. 4 is a flow chart illustrating a method according to step S234 of FIG. 3.
Figure 5:
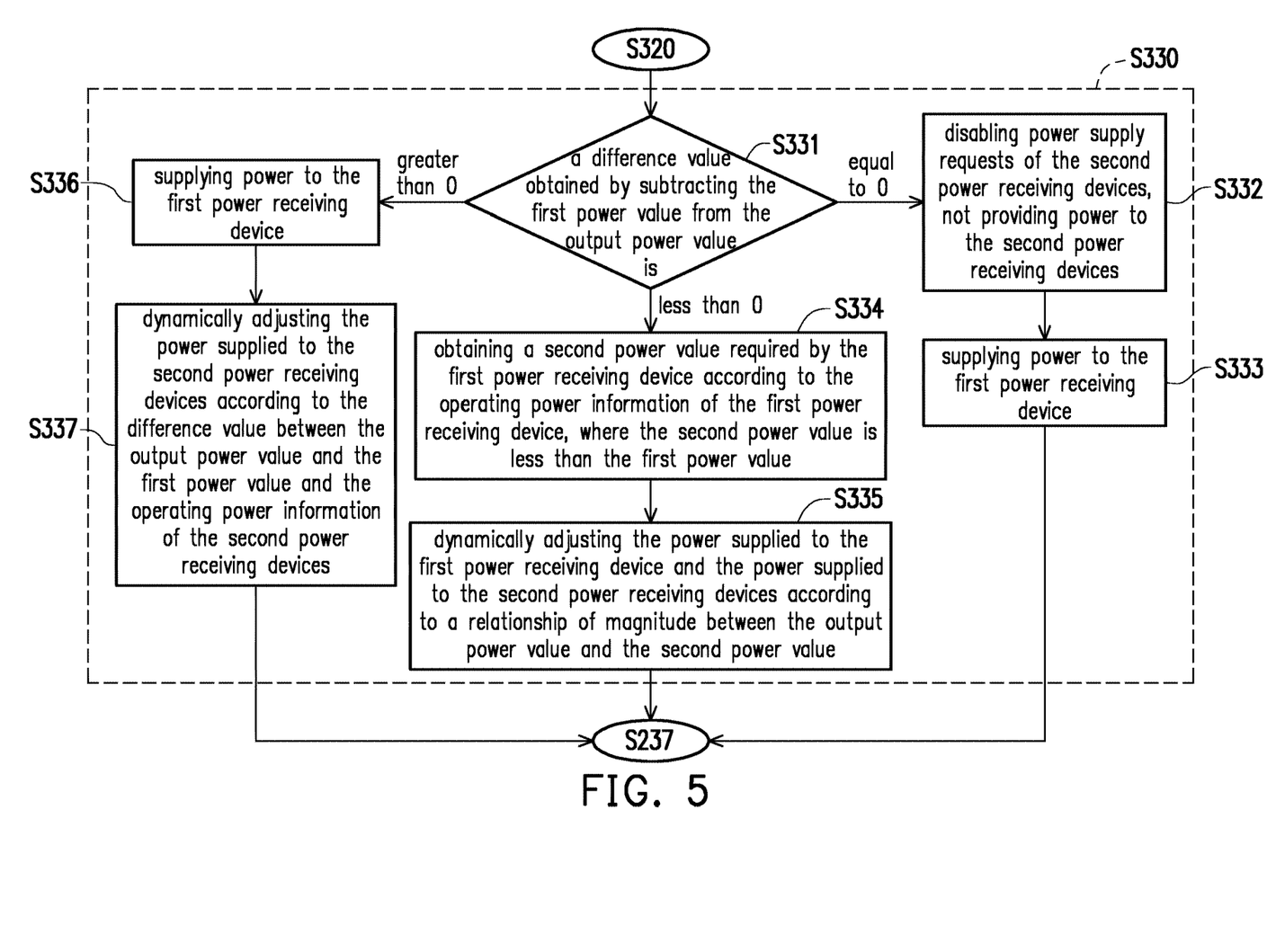
FIG. 5 is a flow chart illustrating a method according to step S330 of FIG. 4.

Implementation detail of step S234 of FIG. 3 is further described below. Referring to FIG. 1, FIG. 4, and FIG. 5 together, FIG. 4 is a flow chart illustrating a method according to step S234 of FIG. 3. FIG. 5 is a flow chart illustrating a method according to step S330 of FIG. 4. In the embodiment, if the first determination result is "yes", the control circuit 140 obtains an output power value of the power supply device 920 in step S310 and obtains a first power value required by the first power receiving device 910 in step S320. For example, the first power receiving device 910 is a device suitable for operating (or being charged) at the power PH of 60 watts. Therefore, the first power value is 60 watts. In the embodiment, the control circuit 140 may obtain the output power value of the power supply device 920 according to the operating power information PRO2 of the power supply device 920. The control circuit 140 may obtain the first power value required by the first power receiving device 910 according to the operating power information PRO1 of the first power receiving device 910. In step S330, the control circuit 140 dynamically adjusts the power PH supplied to the first power receiving device 910 and the power PS1-PS6 supplied to the second power receiving devices 931-936 according to a relationship of magnitude between the output power value and the first power value.

In step S331 of step S330, the control circuit 140 determines the relationship of magnitude between the output power value and the first power value. In step S331 of the embodiment, the control circuit 140 subtracts the first power value from the output power value to obtain a first difference value. If the first difference value is substantially equal to 0, it represents that the output power value is substantially equal to the first power value. If the first difference value is less than 0, it represents that the output power value is less than the first power value. If the first difference value is greater than 0, it represents that the output power value is greater than the first power value.

In the embodiment, if the control circuit 140 determines that the first difference value obtained by subtracting the first power value from the output power value is substantially equal to 0, the control circuit 140 executes step S332. In step S332, the control circuit 140 disables power supply requests of the second power receiving devices 931-936 so that the power supply device 920 does not provide power to the second power receiving devices 931-936. That is, in the case that the output power value is substantially equal to the first power value, the power from the power supply device 920 is not supplied to the second power receiving devices 931-936. In step S333, the control circuit 140 provides the power to the first power receiving device 910. Next, step S237 is executed.

In the embodiment, the electronic device 100 further includes a power bus PBUS and power transmission circuits 151-156. The power bus PBUS is coupled to a bus power pin of the first power supply port 110 and a bus power pin of the power receiving port 120. The power transmission circuits 151-156 are respectively coupled between the power bus PBUS and the second power supply ports 131-136. For example, the power transmission circuit 151 is coupled between the power bus PBUS and the second power supply port 131, the power transmission circuit 152 is coupled between the power bus PBUS and the second power supply port 132, and the rest may be deduced by analogy. The control circuit 140 may control the power transmission circuits 151-156 to determine whether to provide the power provided by the power supply device 920 to the second power receiving devices 931-936. The power transmission circuits 151-156 may be implemented by at least one of a gate-controlled switch or a transmission gate. In step S332, the control circuit 140 cuts off the power transmission circuits 151-156. In this way, the power provided by the power supply device 920 is not supplied to the second power receiving devices 931-936.

In the embodiment, if the control circuit 140 determines that the first difference value obtained by subtracting the first power value from the output power value is greater than 0, the control circuit 140 executes step S336. In step S336, the control circuit 140 provides the power to the first power receiving device 910. In step S337, the control circuit 140 dynamically adjusts the power PS1-PS6 supplied to the second power receiving devices 931-936 according to the first difference value between the output power value and the first power value and the operating power information PRO31-PRO36 of the second power receiving devices 931-936. That is, the control circuit 140 provides remaining power of the power supply device 920 to the second power receiving devices 931-936 after providing the power of the power supply device 920 to the first power receiving device 910. Next, step S237 is executed.

In step S337, the control circuit 140 further determines whether a power value of the remaining power is greater than or equal to a total power value required by the second power receiving devices 931-936. If the power value of the remaining power is greater than the total power value required by the second power receiving devices 931-936, it represents that the remaining power is sufficient to power the second power receiving devices 931-936. Therefore, the control circuit 140 turns on the power transmission circuits 151-156 to supply the power provided by the power supply device 920 to the second power receiving device 931-936.

If the control circuit 140 determines that the aforementioned remaining power is slightly lower than the total power value, the power provided by the power supply device 920 is insufficient for at least a part of the second power receiving devices 931-936, and it is an overload for the power supply device 920. In step S430, the control circuit 140 turns on the power transmission circuits 151-156 and supplies power to the second power receiving devices 931-936 in low power. In this way, the power PS1-PS6 supplied to the second power receiving devices 931-936 may be dynamically adjusted.

If the control circuit 140 determines that the aforementioned remaining power is obviously less than the total power value, the power provided by the power supply device 920 is obviously insufficient for the second power receiving devices 931-936, and it is an overload for the power supply device 920. In this case, the power provided by the power supply device 920 cannot meet minimum power requirements of all of the second power receiving devices 931-936. Therefore, the control circuit 140 turns on a part of the power transmission circuits 151-156 to supply power to a part of the second power receiving devices 931-936 and does not supply power to the other part of the second power receiving devices 931-936. For example, in the case that the remaining power is obviously less than the total power value, the control circuit 140 may turn off the power transmission circuits 151 and 152 and turn on the power transmission circuits 153-156. In this way, power may still be supplied to the second power receiving device 933-936 but is not supplied to the second power receiving devices 931-932. In this way, the power PS1-PS6 supplied to the second power receiving device 931-936 may be dynamically adjusted.

Control of the power transmission circuits 151-156 of the embodiment may be determined based on usage priority weights of the second power supply ports 131-136, usage priority weights of the second power receiving devices 931-936, or power requirements of the second power receiving devices 931-936. For example, the second power receiving device 931 has a lowest usage priority weight, so that when the power supplied by the power supply device 920 cannot satisfy the minimum power requirement of all of the second power receiving devices 931-936, the control circuit 140 prioritizes turning off of the power transmission circuit 151. For another example, the second power receiving device 932 has a highest power requirement, so that when the power supplied by the power supply device 920 satisfies the minimum power requirement of the second power receiving device 932, the control circuit 140 prioritizes turning off of the power transmission circuit 152. The usage priority weights of the second power supply ports 131-136 and the usage priority weights of the second power receiving devices 931-936 may be set according to usage requirements.

In the embodiment, if the control circuit 140 determines that the first difference value obtained by subtracting the first power value from the output power value is less than 0, the control circuit 140 executes step S334. In step S334, the control circuit 140 obtains a second power value required by the first power receiving device 910 according to the operating power information PRO1 of the first power receiving device 910. The second power value is less than the first power value. In step S335, the control circuit 140 dynamically adjusts the power PH supplied to the first power receiving device 910 and the power PS1-PS6 supplied to the second power receiving devices 931-936 according to a relationship of magnitude between the output power value and the second power value. Next, step S237 is executed.

In some embodiments, in step S334, the control circuit 140 disables the power supply request of the first power receiving device 910, so that the power supply device 920 does not provide power to the first power receiving device 910.

It should be noted that the control circuit 140 may dynamically adjust the power PH supplied to the first power receiving device 910 and the power PS1-PS6 configured to be supplied to the second power receiving devices 931-936 according to the output power value of the power supply device 920 and the power value of the first power receiving device 910. Therefore, the control circuit 140 may elastically adjust the power PH supplied to the first power receiving device 910 and the power PS1-PS6 supplied to the second power receiving devices 931-936 according to the power of the power supply device 920 (for example, 15 watts to 100 watts). In this way, an abnormal situation that the electronic device 100 cannot effectively supply power is prevented.

Figure 6:
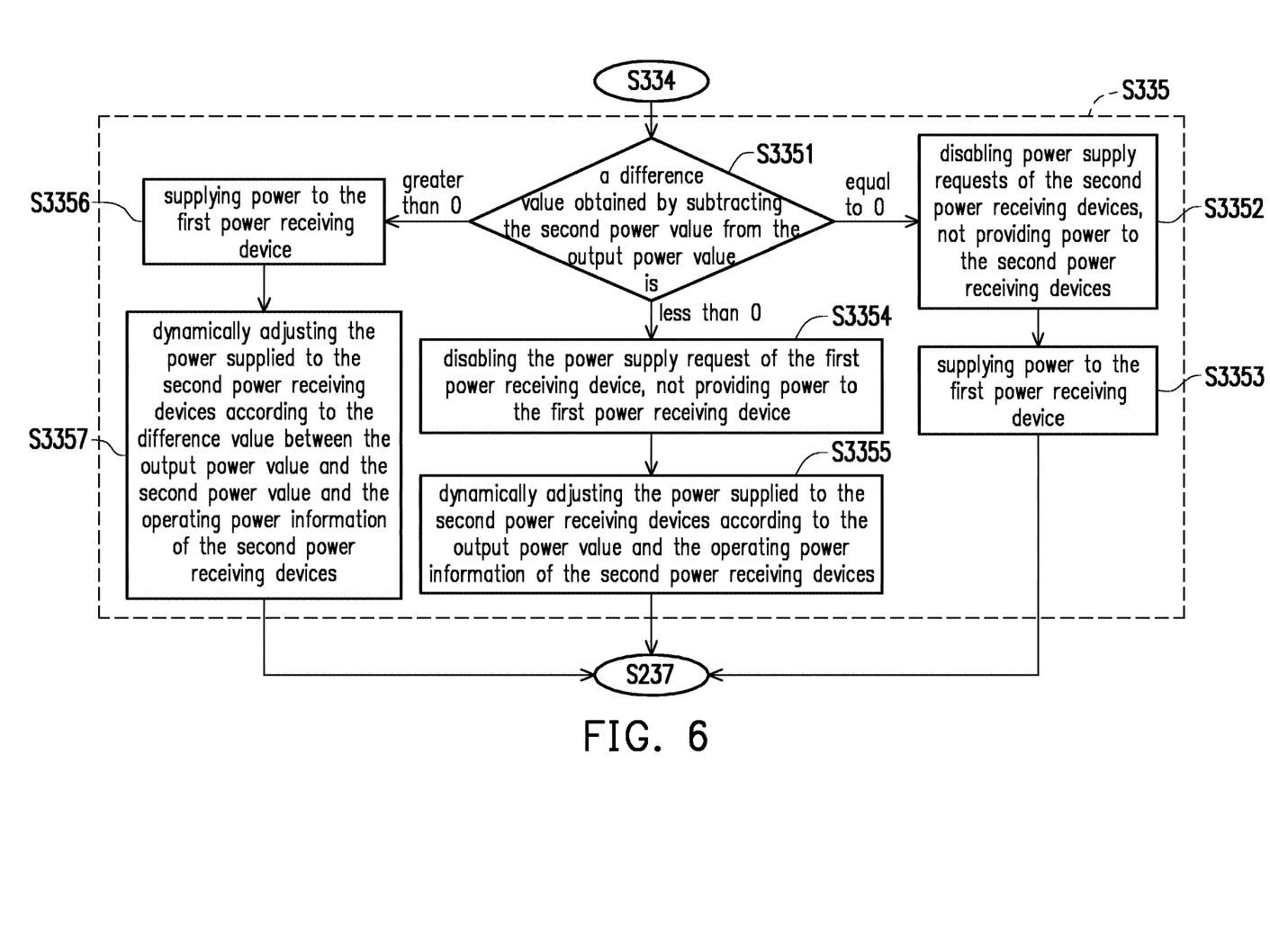
FIG. 6 is a flow chart illustrating a method according to step S335 of FIG. 5.

Implementation detail of step S335 is described below. Referring to FIG. 1 and FIG. 6, in the embodiment, the control circuit 140 determines the relationship of magnitude between the output power value and the second power value in step S3351. In step S3351 of the embodiment, the control circuit 140 subtracts the second power value from the output power value to obtain a second difference value. If the second difference value is substantially equal to 0, it represents that the output power value is substantially equal to the second power value. If the second difference value is less than 0, it represents that the output power value is less than the second power value. If the second difference value is greater than 0, it represents that the output power value is greater than the second power value. For example, the first power receiving device 910 is a device suitable for operating (or being charged) at the power PH of 60 watts. Therefore, the first power value is 60 watts. The minimum power PH that the first power receiving device 910 may accept (for example, the power PH for charging only) is 15 watts. Therefore, the second power value may be 15 watts. According to a design requirement, the second power value may be designed to be any power value lower than the first power value. For instance, the second power value is designed to be any power value lower than 60 watts and greater than or equal to 15 watts (for example, 15 watts, 18 watts, 36 watts, etc.).

In the embodiment, if the control circuit 140 determines that the second difference value obtained by subtracting the second power value from the output power value is substantially equal to 0, the control circuit 140 executes step S3352. In step S3352, the control circuit 140 disables the power supply requests of the second power receiving devices 931-936 so that the power supply device 920 does not provide power to the second power receiving devices 931-936. Namely, in the case that the output power value is substantially equal to the second power value, the power from the power supply device 920 is not supplied to the second power receiving devices 931-936. In step S333, the control circuit 140 provides the power to the first power receiving device 910. Next, step S237 is executed.

In the embodiment, if the control circuit 140 determines that the second difference value obtained by subtracting the second power value from the output power value is greater than 0, the control circuit 140 executes step S3356. In step S3356, the control circuit 140 provides the power to the first power receiving device 910. In step S3357, the control circuit 140 dynamically adjusts the power PS1-PS6 supplied to the second power receiving devices 931-936 according to the second difference value between the output power value and the second power value and the operating power information PRO31-PRO36 of the second power receiving devices 931-936. That is, the control circuit 140 provides remaining power of the power supply device 920 to the second power receiving devices 931-936 after providing the power of the power supply device 920 to the first power receiving device 910. Next, step S237 is executed. The step of dynamically adjusting the power PS1-PS6 supplied to the second power receiving devices 931-936 may be implemented by a cooperative operation of the control circuit 140 and the power transmission circuits 151-156 in the aforementioned step S337, which is not repeated herein.

In the embodiment, if the control circuit 140 determines that the second difference value obtained by subtracting the second power value from the output power value is less than 0, the control circuit 140 executes step S3354. In step S3354, the control circuit 140 disables the power supply request of the first power receiving device 910, so that the power supply device 920 does not provide power to the first power receiving device 910. In step S3355, the control circuit 140 dynamically adjusts the power PS1-PS6 supplied to the second power receiving devices 931-936 according to the output power value and the operating power information PRO31-PRO36 of the second power receiving devices 931-936. That is, in the case that the output power value of the power supply device 920 is less than the second power value, the power provided by the power supply device 920 is not suitable for the first power receiving device 910. Therefore, the control circuit 140 supplies the power provided by the power supply device 920 to the second power receiving devices 931-936 rather than the first power receiving device 910. Next, step S237 is executed.

Figure 7:
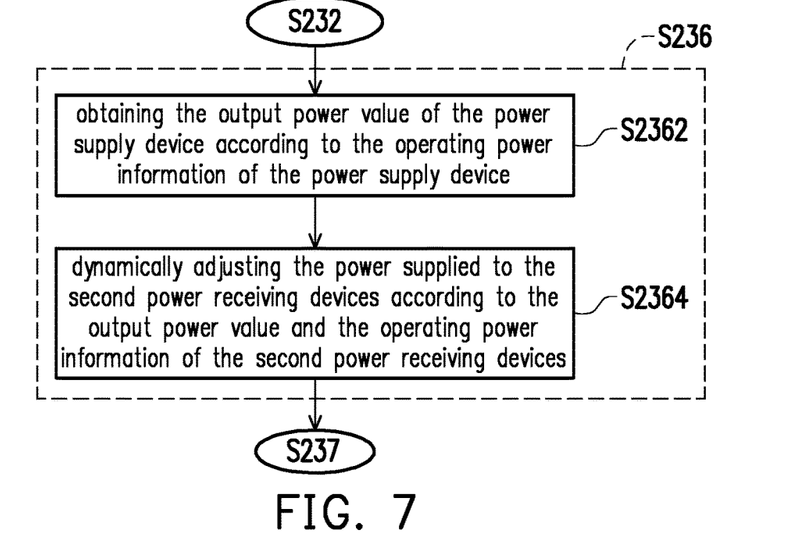
FIG. 7 is a flow chart illustrating a method according to step S236 of FIG. 3.

Implementation detail of step S236 of FIG. 3 is described below. Referring to FIG. 1 and FIG. 7 together, FIG. 7 is a flow chart illustrating a method according to step S236 of FIG. 3. In the embodiment, if the first determination result is "no", the control circuit 140 obtains the output power value of the power supply device 920 according to the operating power information PRO2 of the power supply device 920 in step S2362 of step S236 and dynamically adjusts the power PS1-PS6 supplied to the second power receiving devices 931-936 according to the output power value and the operating power information PRO31-PRO36 of the second power receiving devices 931-936 in step S2364 of step S236.

Figure 8:
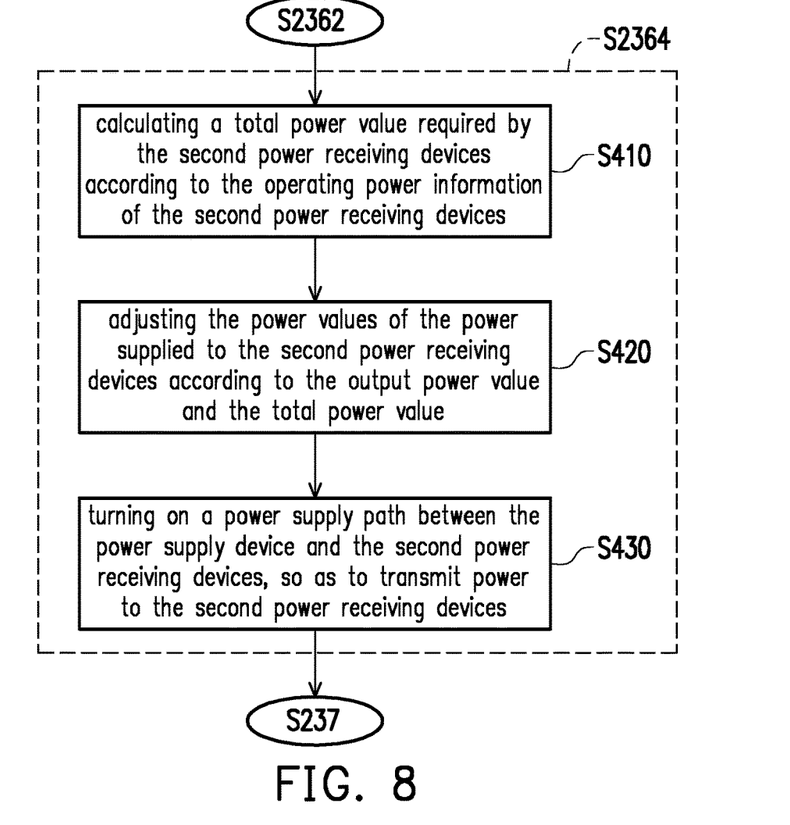
FIG. 8 is a flowchart illustrating a method according to step S2364 of FIG. 7.

Implementation detail of step S2364 is described below. Referring to FIG. 1 and FIG. 8, FIG. 8 is a flow chart illustrating a method according to step S2364 of FIG. 7. In the embodiment, the control circuit 140 calculates a total power value required by the second power receiving devices 931-936 according to the operating power information PRO31-PRO36 of the second power receiving devices 931-936 in step S410 of step S2364. The control circuit 140 adjusts the power values of the power PS1-PS6 supplied to the second power receiving devices 931-936 according to the output power value and the total power value in step S420. The control circuit 140 turns on a power supply path between the power supply device 920 and the second power receiving devices 931-936 in step S430, so as to transmit power to at least one of the second power receiving devices 931-936.

In the embodiment, when the first determination result indicates that the power is prioritized to be supplied to the second power receiving devices 931-936, the control circuit 140 calculates the total power value required by the second power receiving devices 931-936 according to the operating power information PRO31-PRO36 of the second power receiving devices 931-936 in step S410. If the control circuit 140 determines that the output power value is greater than or equal to the total power value in step S420, it represents that the power provided by the power supply device 920 is sufficient for the second power receiving devices 931-936. Therefore, in step S430, the control circuit 140 turns on the power transmission circuits 151-156 to supply the power PS1-PS6 required by the second power receiving devices 931-936.

On the other hand, if the control circuit 140 determines that the output power value is less than the total power value in step S420, the power provided by the power supply device 920 is insufficient for at least a part of the second power receiving devices 931-936. In step S430, the control circuit 140 may turn on the power transmission circuits 151-156 to supply the power PS1-PS6 lower than the power required by the second power receiving devices 931-936.

In view of the foregoing, in the electronic device and the power distribution method of the invention, the power supplied to the first power receiving device and the power supplied to the at least one second power receiving device is dynamically adjusted according to the operating power information of the power supply device, the operating power information of the first power receiving device, and the operating power information of the at least one second power receiving device. Therefore, the electronic device is capable of dynamically supplying power to at least one of the first power receiving device and the at least one second power receiving device according to the plurality of pieces of the operating power information. In this way, an overload is prevented from occurring in the power supply device of the electronic device. Moreover, the electronic device may effectively supply power to at least one of the first power receiving device and the second power receiving devices.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An electronic device having a power distribution mechanism, the electronic device comprising:
a first power supply port, electrically connected to a first power receiving device;
a power receiving port, electrically connected to a power supply device;
at least one second power supply port, electrically connected to at least one second power receiving device, respectively; and a control circuit, coupled to the power receiving port, the first power supply port, and the at least one second power supply port, and obtaining operating power information of the first power receiving device, operating power information of the power supply device, and operating power information of the at least one second power receiving device;

wherein the control circuit dynamically adjusts power supplied to the first power receiving device and power supplied to the at least one second power receiving device from the power supply device according to the operating power information of the power supply device, the operating power information of the first power receiving device, and the operating power information of the at least one second power receiving device, wherein when an output power value of the power supply device is less than a sum of power values required by the first power receiving device and the at least one second power receiving device and when the first power receiving device is determined to prioritize power supply, the control circuit dynamically adjusts the power supplied to the at least one second power receiving device to drive at least one of the at least one second power receiving device according to a difference between the output power value of the power supply device and a first power value of the first power receiving device.

2. The electronic device as claimed in claim 1, wherein:
the control circuit determines whether to prioritize power supply to the first power receiving device to obtain a first determination result;

if the first determination result is yes, the control circuit dynamically adjusts the power supplied to the first power receiving device and the power supplied to the at least one second power receiving device according to the operating power information of the power supply device and the operating power information of the first power receiving device; and if the first determination result is no, the control circuit dynamically adjusts the power supplied to the at least one second power receiving device according to the operating power information of the power supply device and the operating power information of the at least one second power receiving device.

3. The electronic device as claimed in claim 2, wherein if the first determination result is yes, the control circuit obtains an output power value of the power supply device according to the operating power information of the power supply device, the control circuit obtains a first power value required by the first power receiving device according to the operating power information of the first power receiving device, and the control circuit dynamically adjusts the power supplied to the first power receiving device and the power supplied to the at least one second power receiving device according a relationship of magnitude between the output power value and the first power value.

4. The electronic device as claimed in claim 3, wherein the control circuit disables a power supply request of the at least one second power receiving device when the output power value is substantially equal to the first power value, so that the power supply device stop supplying power to the at least one second power receiving device.

5. The electronic device as claimed in claim 3, wherein the control circuit obtains a second power value required by the first power receiving device according to the operating power information of the first power receiving device if the output power value is less than the first power value, and the control circuit dynamically adjusts the power supplied to the first power receiving device and the power supplied to the at least one second power receiving device according to a relationship of magnitude between the output power value and the second power value, wherein the second power value is less than the first power value.

6. The electronic device as claimed in claim 5, wherein:
the control circuit disables a power supply request of the first power receiving device if the output power value is less than the second power value, so that the power supply device does not supply power to the first power receiving device, and the control circuit dynamically adjusts the power supplied to the at least one second power receiving device according to the output power value and the operating power information of the at least one second power receiving device;

the control circuit disables a power supply request of the at least one second power receiving device if the output power value is substantially equal to the second power value, so that the power supply device does not supply power to the at least one second power receiving device, and the control circuit dynamically adjusts the power supplied to the at least one second power receiving device according to a difference between the output power value and the second power value and the operating power information of the at least one second power receiving device if the output power value is greater than the second power value.

7. The electronic device as claimed in claim 3, wherein, the control circuit disables a power supply request of the first power receiving device if the output power value is less than the first power value, so that the power supply device does not supply power to the first power receiving device.

8. The electronic device as claimed in claim 3, wherein the control circuit dynamically adjusts the power supplied to the at least one second power receiving device according to a difference between the output power value and the first power value and the operating power information of the at least one second power receiving device if the output power value is greater than the first power value.

9. The electronic device as claimed in claim 2, wherein the control circuit obtains an output power value of the power supply device according to the operating power information of the power supply device if the first determination result is no and dynamically adjusts the power supplied to the at least one second power receiving device by the power supply device according to the output power value and the operating power information of the at least one second power receiving device.

10. The electronic device as claimed in claim 9, further comprising:
a power bus, coupled to a bus power pin of the first power supply port and a bus power pin of the power receiving port; and a power transmission circuit, coupled between the power bus and the at least one second power supply port and serving as a power supply path between the power supply device and the at least one second power receiving device;

wherein the control circuit calculates a total power value required by the at least one second power receiving device according to the operating power information of the at least one second power receiving device if the first determination result is no, the control circuit adjusts a power value of the power supplied to the at least one second power receiving device according to the output power value and the total power value, and the control circuit controls the power transmission circuit to transmit power to the at least one second power receiving device.

11. The electronic device as claimed in claim 2, wherein: the control circuit detects whether a current drawn by the first power receiving device is less than a threshold value to obtain a second determination result if the power supply device supplies power to the first power receiving device, and, the control circuit re-determines whether to prioritize power supply to the first power receiving device if the second determination result is yes.

12. The electronic device as claimed in claim 1, wherein each of the first power supply port and the power receiving port is a universal serial bus type C port;
wherein the at least one second power supply port comprises:
   a universal serial bus port, electrically connected to a universal serial bus device in the at least one second power receiving device; and
   an image transmission port, electrically connected to a multimedia device in the at least one second power receiving device;
wherein the control circuit comprises:
   a power supply controller, coupled to the first power supply port and the power receiving port, configured to obtain the operating power information of the first power receiving device and the operating power information of the power supply device, and adjusting the power supplied to the first power receiving device;
   a hub, coupled to the power supply controller and the universal serial bus port and configured to obtain operating power information of the universal serial bus device; and
   a peripheral controller, coupled to the power supply controller and the image transmission port and configured to obtain operating power information of the multimedia device.

13. A power distribution method, comprising:
respectively obtaining operating power information of a first power receiving device, operating power information of a power supply device, and operating power information of at least one second power receiving device through a first power supply port, a power receiving port, and at least one second power supply port; and
dynamically adjusting power supplied to the first power receiving device and power supplied to the at least one second power receiving device from the power supply device according to the operating power information of the power supply device, the operating power information of the first power receiving device, and the operating power information of the at least one second power receiving device through a control circuit, wherein the step of dynamically adjusting the power supplied to the first power receiving device and the power supplied to the at least one second power receiving device from the power supply device comprises:
   obtaining a difference between an output power value of the power supply device and a first power value of the first power receiving device, a power value comparing result between the power value of the power supply device and a sum of power values required by the first power receiving device and the at least one second power receiving device, and a power supply priority of the first power receiving device through the control circuit; and
   dynamically adjusting the power supplied to the at least one second power receiving device to drive at least one of the at least one second power receiving device through the control circuit according to the difference between an output power value of the power supply device and the first power value of the first power receiving device, the power value comparing result and the power supply priority of the first power receiving device.

14. The power distribution method as claimed in claim 13, wherein the step of dynamically adjusting the power supplied to the first power receiving device and the power supplied to the at least one second power receiving device from the power supply device further comprises:
   determining whether to prioritize power supply to the first power receiving device to obtain a first determination result;
   dynamically adjusting the power supplied to the first power receiving device and the power supplied to the at least one second power receiving device according to the operating power information of the power supply device and the operating power information of the first power receiving device if the first determination result is yes; and
   dynamically adjusting the power supplied to the at least one second power receiving device according to the operating power information of the power supply device and the operating power information of the at least one second power receiving device if the first determination result is no.

15. The power distribution method as claimed in claim 14, wherein the step of dynamically adjusting the power supplied to the first power receiving device and the power supplied to the at least one second power receiving device according to the operating power information of the power supply device and the operating power information of the first power receiving device comprises:
   obtaining an output power value of the power supply device according to the operating power information of the power supply device;
   obtaining a first power value required by the first power receiving device according to the operating power information of the first power receiving device; and
   dynamically adjusting the power supplied to the first power receiving device and the power supplied to the at least one second power receiving device according a relationship of magnitude between the output power value and the first power value.

16. The power distribution method as claimed in claim 15, wherein the step of dynamically adjusting the power supplied to the first power receiving device and the power supplied to the at least one second power receiving device according the relationship of magnitude between the output power value and the first power value comprises:
   disabling a power supply request of the at least one second power receiving device when the output power value is substantially equal to the first power value, so that the power supply device stop supplying power to the at least one second power receiving device.

17. The power distribution method as claimed in claim 15, wherein the step of dynamically adjusting the power supplied to the first power receiving device and the power supplied to the at least one second power receiving device according the relationship of magnitude between the output power value and the first power value comprises:
- obtaining a second power value required by the first power receiving device according to the operating power information of the first power receiving device if the output power value is less than the first power value, wherein the second power value is less than the first power value; and
- dynamically adjusting the power supplied to the first power receiving device and the power supplied to the at least one second power receiving device according to a relationship of magnitude between the output power value and the second power value.

18. The power distribution method as claimed in claim 17, wherein the step of dynamically adjusting the power supplied to the first power receiving device and the power supplied to the at least one second power receiving device according to the relationship of magnitude between the output power value and the second power value comprises:
- disabling a power supply request of the first power receiving device if the output power value is less than the second power value so that the power supply device does not supply power to the first power receiving device and dynamically adjusting the power supplied to the at least one second power receiving device according to the output power value and the operating power information of the at least one second power receiving device;
- disabling a power supply request of the at least one second power receiving device if the output power value is substantially equal to the second power value, so that the power supply device does not supply power to the at least one second power receiving device; and
- dynamically adjusting the power supplied to the at least one second power receiving device according to a difference between the output power value and the second power value and the operating power information of the at least one second power receiving device if the output power value is greater than the second power value.

19. The power distribution method as claimed in claim 15, wherein the step of dynamically adjusting the power supplied to the first power receiving device and the power supplied to the at least one second power receiving device according the relationship of magnitude between the output power value and the first power value comprises:
- disabling a power supply request of the first power receiving device if the output power value is less than the first power value, so that the power supply device does not supply power to the first power receiving device.

20. The power distribution method as claimed in claim 15, wherein the step of dynamically adjusting the power supplied to the first power receiving device and the power supplied to the at least one second power receiving device according the relationship of magnitude between the output power value and the first power value comprises:
- dynamically adjusting the power supplied to the at least one second power receiving device according to a difference between the output power value and the first power value and the operating power information of the at least one second power receiving device if the output power value is greater than the first power value.

21. The power distribution method as claimed in claim 14, wherein the step of dynamically adjusting the power supplied to the at least one second power receiving device according to the operating power information of the power supply device and the operating power information of the at least one second power receiving device comprises:
- obtaining an output power value of the power supply device according to the operating power information of the power supply device; and
- dynamically adjusting the power supplied to the at least one second power receiving device according to the output power value and the operating power information of the at least one second power receiving device.

22. The power distribution method as claimed in claim 21, wherein the step of dynamically adjusting the power supplied to the at least one second power receiving device according to the output power value and the operating power information of the at least one second power receiving device comprises:
- calculating a total power value required by the at least one second power receiving device according to the operating power information of the at least one second power receiving device;
- adjusting a power value of the power supplied to the at least one second power receiving device according to the output power value and the total power value; and
- turning on a power supply path between the power supply device and the at least one second power receiving device to transmit power to the at least one second power receiving device.

23. The power distribution method as claimed in claim 14, wherein the step of dynamically adjusting the power supplied to the first power receiving device and the power supplied to the at least one second power receiving device from the power supply device further comprises:
- determining whether a current drawn by the first power receiving device is less than a threshold value to obtain a second determination result if the power supply device supplies power to the first power receiving device; and
- re-determining whether to prioritize power supply to the first power receiving device if the second determination result is yes.

* * * * *